(No Model.) 3 Sheets—Sheet 2.
W. MILBRATH.
CORN HARVESTER AND SHOCKER.
No. 551,446. Patented Dec. 17, 1895.
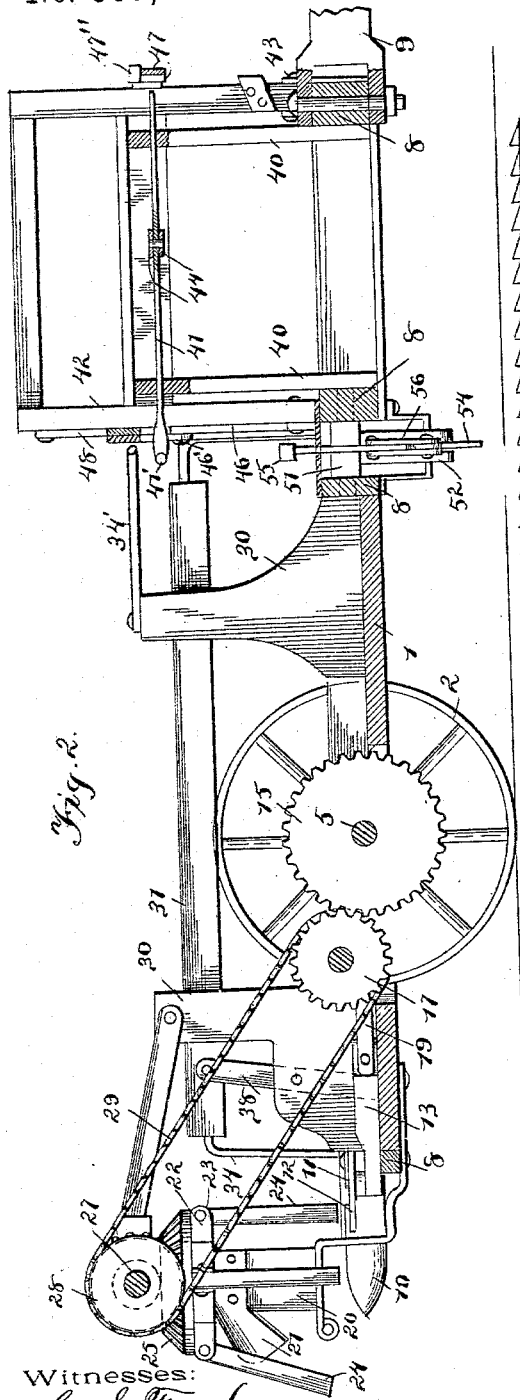
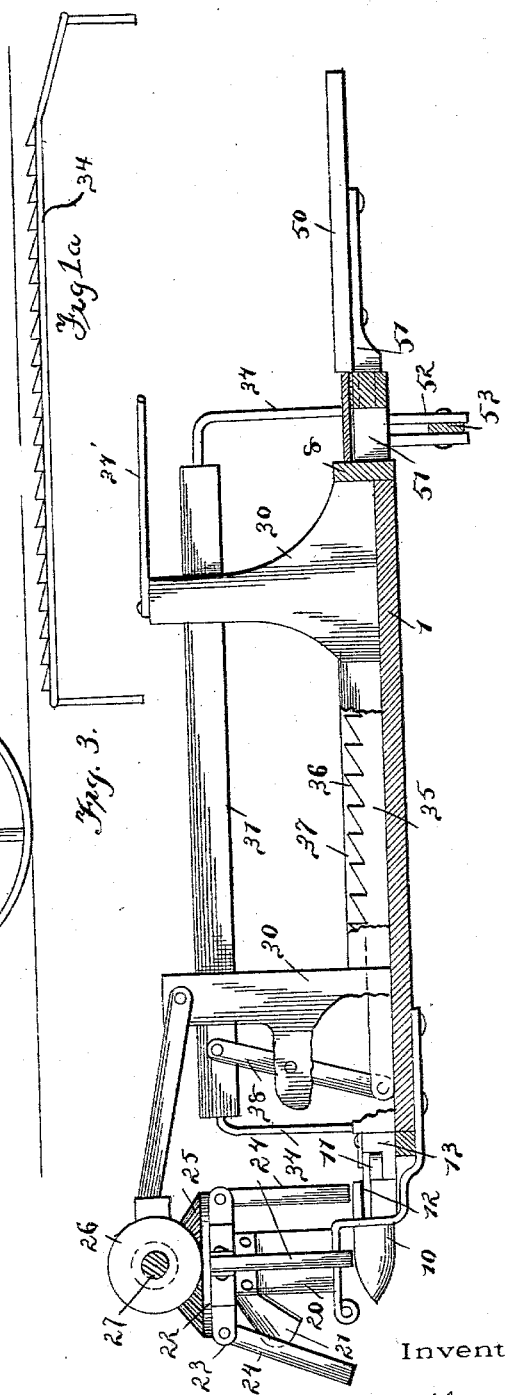
Witnesses:
Geo. E. Fuch
N. L. Collamer
Inventor:
William Milbrath,
by Louis Feeser
Attorneys.

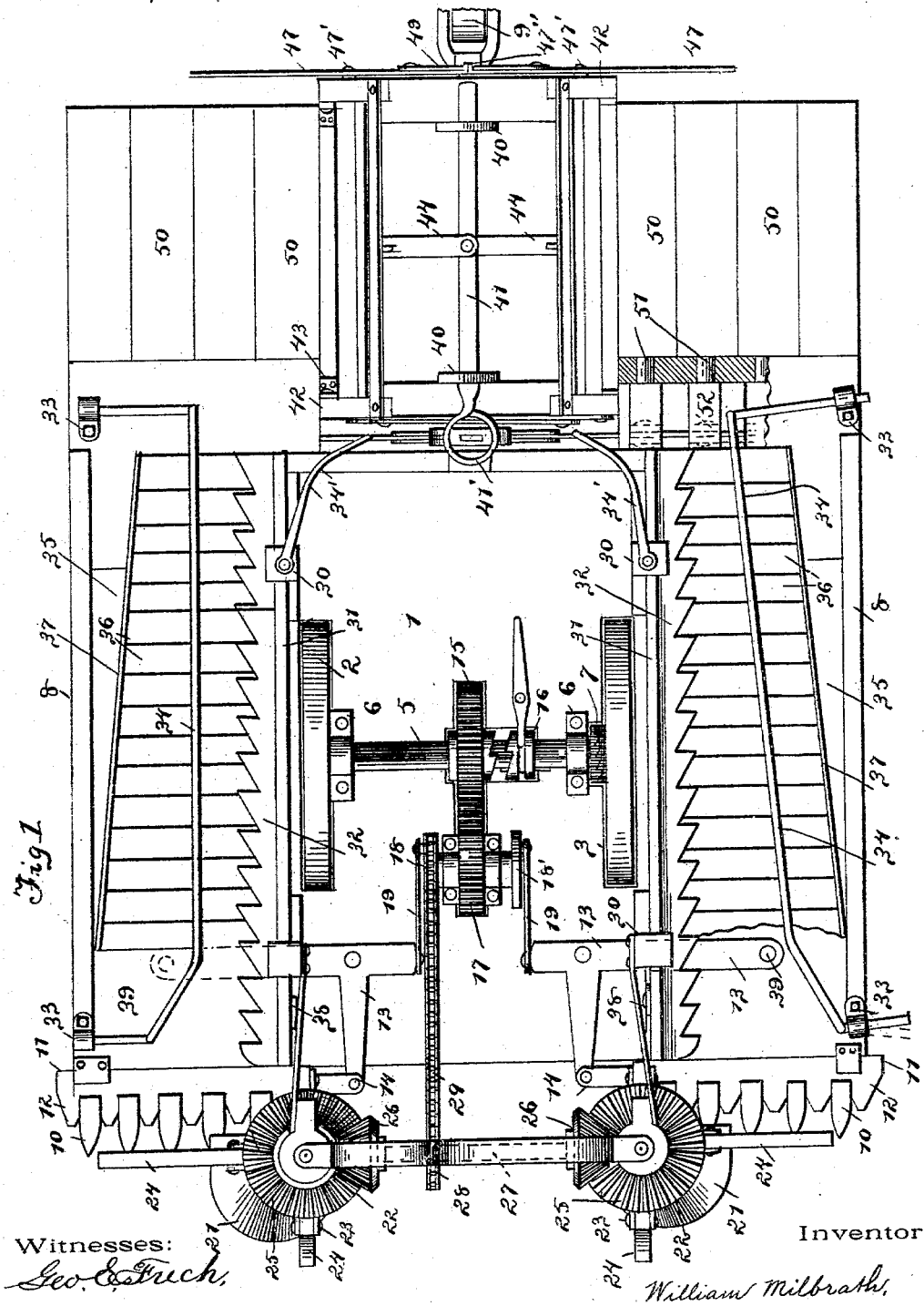

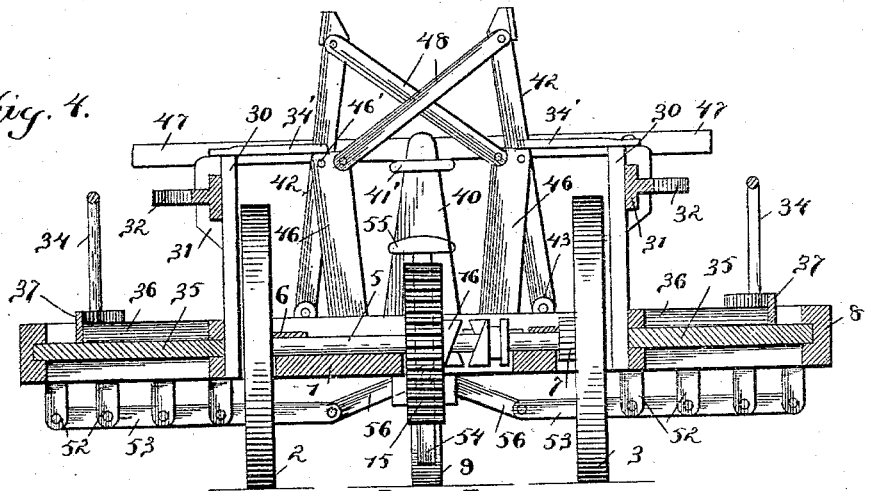

UNITED STATES PATENT OFFICE.

WILLIAM MILBRATH, OF LAKEFIELD, MINNESOTA.

CORN HARVESTER AND SHOCKER.

SPECIFICATION forming part of Letters Patent No. 551,446, dated December 17, 1895.

Application filed March 22, 1895. Serial No. 542,763. (No model.)

*To all whom it may concern:*

Be it known that I, WILLIAM MILBRATH, a citizen of the United States, residing in the village of Lakefield, county of Jackson, and State of Minnesota, have invented a new and useful Corn Harvester and Shocker, of which the following is a specification.

This invention relates to harvesters, and more especially to that class thereof adapted for cutting and shocking corn; and the object of the same is to effect certain improvements in machines of this class, more especially in the stalk-conveyer, the shocker, the table-dump, and the mechanism for driving the cutting apparatus, reel, and conveyer.

The invention consists in certain details of construction of these and of other parts of the machine, all as hereinafter more fully described and claimed, and as illustrated in the accompanying drawings, wherein—

Figure 1 is a plan view of this machine complete, showing one conveyer adjusted for large corn and the shocker ready to receive the stalks. Fig. 1ª is a detail in plan view of one form of guide. Fig. 2 is a central longitudinal section. Fig. 3 is a longitudinal section taken along just inside one reel and one conveyer. Fig. 4 is a central cross-section through the axle looking to the rear and illustrating the shocker in the position shown in Fig. 1 and the dumping-tables closed. Fig. 5 is a cross-section just in rear of the platform, showing the table-dumping mechanism as in a position opposite to that of Fig. 4, whereby the tables are dumped, and illustrating the shocker in a position opposite to that shown in Fig. 4. Fig. 6 is a perspective view of the shocker, showing its rear wings.

This machine comprises the following principal elements, to wit: the main platform supported by two driving-wheels and with its rear end supported by a caster-wheel, the cutting apparatus in duplicate at the front end of the platform, two reels above the cutting apparatus, two stalk-conveyers along the sides of the platform to carry the stalks from the cutting apparatus to the rear, the shocker at the rear end of the platform, and two dumping-tables at opposite sides of the shocker.

No novelty is claimed for the cutting apparatus, the reels, or the dumping-tables, except as to the specific details of construction hereinafter included in the clauses of the claim; but the principal points of novelty are held to exist in the conveyers, the driving mechanism, the shocker, and the dumping mechanism.

The principal parts of the machine will now be severally described.

*The platform.*—The numeral 1 designates a table supported by driving-wheels 2 and 3, the former of which is rigidly mounted on the axle 5 journaled in bearings 6 on the table, and the latter wheel (3) secured to this axle by a backing-ratchet 7 of any well-known construction, so as to permit the machine to turn corners. This table 1 forms part of a general platform carrying transverse and longitudinal beams 8 and properly braced and strengthened as will be necessary, and at the rear end of the platform is mounted a caster-wheel 9 which drags behind the machine, supports its rear extremity, and permits it to turn corners, as will be clear. To the front end of the platform are attached the thills (not shown) within which will be fastened the horse which draws the machine; and if one horse is not sufficient two or more may be hitched tandem so as to furnish the requisite power. It will be understood that the horse or horses travel between the two adjacent rows of corn which the machine is to cut, and they are preferably muzzled as usual to prevent them from eating the ears.

*The cutting apparatus.*—These are in duplicate and of any approved construction; but each preferably consists of a number of guard-fingers 10 arranged in a group and projecting forward from the front ends of the lateral wings or sides of the platform, a cutter-bar 11 sliding through these fingers, and knives 12 secured to the bar to do the cutting in the usual manner. 13 is a T-shaped lever pivoted at its angle on the table 1 with its single leg projecting forward and pivoted as at 14 to the cutter-bar. 15 is a power-gear mounted loosely on the axle 5 and adapted to be connected therewith and rotated thereby by means of a clutch 16 of any suitable construction. 17 is a driven gear meshing with the power-gear 15, and this driven gear is secured to a stub-shaft journaled in bearings on the table and carrying at its extremities crank-wheels 18 and 18', and 19 are pitmen pivotally connecting the cranks of these wheels with one arm of the T-shaped levers 13. Thus it will be seen that when the power-gear is locked to the shaft by the clutch 16 the turning of the shaft will drive the gear 17 and its crank-wheels, and the latter through their pitmen will move the T-shaped levers, which levers are connected with the cutting apparatus, and will cause the knives to reciprocate through the guard-fingers.

*The reels.*—These are also in duplicate and stand forward of the table and above the inner ends of the cutting apparatus. 20 is an upright carrying a cam 21 at its upper end, and journaled on this upper end above the cam is a wheel 22, having several (preferably four) pairs of ears 23, in which are pivoted the reel-arms 24, the construction being such that when the wheel rotates the arms hang pendent except when they rise over the cam 21 to a horizontal position just above the cutting apparatus, and they fall again after they have pushed the stalks from the cutting apparatus into the conveyer. On the hub of each wheel 22 is a bevel-gear 25, and the two bevel-gears mesh with others (numbered 26,) which are mounted on the extremities of a shaft 27. The latter carries a sprocket-wheel 28 connected by a sprocket-chain 29 with the crank-wheel 18 above described, whose face is provided with sprocket-teeth for this purpose. Thus it will be seen that the manipulation of the clutch 16 not only causes the movement of the cutting apparatus, but also drives the wheels.

*The conveyers.*—These are in duplicate, and a description of one will suffice for both. From each side of the table 1 rise guides 30, in which are mounted longitudinal racks 31 of T-shaped cross-section (seen in Fig. 4) and whose teeth 32 project laterally outward and face to the rear. 33 are clips mounted on the side beam 8 of the platform and adjustably clamping the extremities of a guide 34, whose body may be plain, as seen, Fig. 1, or toothed, as seen in Fig. 1ᵃ, and whose body may be adjusted under these clips so as to stand parallel with the rack 31, or (preferably) so as to converge toward the same toward the rear end of the machine, thus forming a passage-way in which the stalks, standing upright after having been cut, can be passed to the rear and compressed as they progress. 34' is a finger which I preferably employ and which is secured at its front end on the rearmost upright guide 30 and projects rearward over the rack 31 and is then bent inward toward the shocker, its function being to prevent the stalks from falling between the rack and shocker onto the table as described below. 35 designates what I shall call a "support," which consists of a flat table sliding on the side of the platform and having on its upper face transverse ratchet-teeth 36 facing to the rear and diminishing in length from the front of the machine toward the rear, and along the outer edges of these teeth is an upright plate 37. 38 is a rock-lever pivoted between its ends to the forward upright guide 30 and having its upper extremity pivotally connected with the rack and its lower extremity pivotally connected with the inner edge of the support. The outer short arm of the T-lever 13 projects beneath the front end of the support (as seen in dotted lines at one side of Fig. 1 and in full lines where broken away at the other side thereof) and is pivoted as at 39 beneath the support. By this construction it will be seen that the oscillatory movement of the T-lever causes a reciprocatory movement of the support longitudinal of the machine, and this movement is communicated through the rock-lever 38 to the rack 31, which is caused to move in unison with but opposite to said support. Hence as the stalks are cut by the cutting apparatus and passed to the rear by the reel they enter the passage-way between the rack and guide and are passed rearward by the alternate engagement and movement of the teeth of the rack and the teeth of the support, being gradually compressed by the oblique position of the guide 34 and of the plate 37 until they pass out of the rear end of this passage-way and are ready to be shocked.

*The shocker.*—Rising from the rear end of the platform are two guides 40 which stand in longitudinal alignment, and through eyes in their upper ends moves a sliding bar 41 having a handle 41' at its front end. At each side of this pair of guides is located an H-shaped frame 42 whose feet are pivoted, as at 43, to beams 8 of the platform, and 44 are links pivotally connecting the cross-bars of the two frames 42 with the sliding bar 41, so that when this bar is moved longitudinally the frames are caused to swing inward toward and outward away from the center. 46 and 47 are wings made in pairs and pivoted respectively to the front ends and to the rear ends of these frames 42. Each of the wings 46 is pivoted at one corner of its inner end, as at 46', and a link 48 is pivoted to the other corner of this inner end, extends obliquely across, and is pivoted to the opposite frame 42, as best seen in Figs. 4 and 5, so that the two links 48 cross each other. The rear wings 47 are pivoted between their extremities, as at 47', to the rear ends of the frames 42, and are connected above such pivots by a single link 49, preferably having a notch 49' at the center of its upper edge. The upper extremities of these wings may be provided with ears 47" which, when the wings and link stand horizontal, will enter the notch 49' and prevent further movement of parts or further separation of the frames. As thus constructed, when the handle 41' and bar 41 are pressed to the rear, the links 44 separate the frames 42, and the rear wings 47 are thrown out horizontal, while the front wings 46 are caused to hang pendent, as seen in Fig. 4. At this time the stalks issuing from the rear ends of the passage-ways may be stacked against the sides of the frames and the front faces of the rear wings and shocked or tied, their lower ends resting upon the dumping-tables hereinafter described, and the fingers 34' preventing them from tilting forward on the table 1. When the handle 41' is drawn forward, the links 44 cause the frames 42 to swing toward each other, as seen in Fig. 5, and this movement causes the rear wings 47 to drop and the front wings 46 to be thrown out horizontal beneath the fingers 34', whereby said front wings check the exit from the passage-way of further stalks and the said rear wings permit the discharge of the shocks.

*The dumping-tables.*—These are located at each rear corner of the platform, and are practical duplicates, although they are controlled by a single handle. The numerals 50 designate a number of slats, each of which is mounted upon the upper side of a shaft 51 journaled longitudinally through two contiguous cross-beams 8 and carrying a depending arm 52. The latter is preferably bifurcated for the reception of a transverse rod 53 which passes through all of the arms of the series and is pivoted thereto. 54 is an upright rod sliding through suitable guides and having a handle 55 at its upper end, and 56 are links pivotally connecting the body of this upright rod with the two rods 53. With this construction, when the handle 55 and upright 54 are depressed through the guides, the links 56 move the two rods 53 outward, the arms 52 are swung outward, the shafts 51 are locked in their bearings, and the slats 50 are closed; but when the handle 55 is raised the same connecting mechanism turns the slats open like those of a window-blind. By this construction it will be seen that the lower end of a shock being formed by the shocker rests upon slats which are supported only at their front ends, and when they are turned so as to stand partially or wholly on edge, as above described, the stalks can pass between them and drop onto the ground, and the forward progress of the machine will leave the shock standing.

All parts of this machine are of the desired sizes, shapes, proportions, and materials, and considerable change in the specific details may be made without departing from the essential principles of my invention. The cutting apparatus could be replaced by another of different form and operation, and the reels might be omitted entirely or be replaced by others at pleasure. The dumping-tables instead of being made of a number of slats, could each consist of one broad table mounted on a shaft as described above and connected with the handle; but as such a table would probably throw the shock on its side I prefer the construction described and shown and which is intended to leave the shock standing upright. I lay particular stress on the construction of the conveyer and the shocker, and I also consider the driving mechanism which simultaneously operates the cutting apparatus, the reels, and the conveyers, yet can be thrown out by a single clutch, as a valuable feature of this machine.

The specific construction and operation of each part of the machine have been described above. In use, there will be two operators, one of whom will lead the horse or preferably sit on a seat (not shown) and drive the horse, being in position to watch the operation of the cutting apparatus, the reels, and conveyers. The other operator will stand at the rear of the table 1 and will form the shocks, having control of the shocker and the dumping-tables, and manipulating the latter when it is desirable to drop the shocks at proper intervals.

What is claimed as new is—

1. In a corn harvester, the combination with the main platform, and a cutting apparatus at its front end; of a stalk conveyer in rear of said apparatus consisting of a support mounted on the platform and having on its upper face teeth facing to the rear, a rack above the inner edge of the support, an upright plate carried by the outer edge of the support and converging to the rear toward the rack, and a guide carried by the platform opposite said rack and also having teeth facing to the rear; and means substantially as described for imparting a longitudinal reciprocating motion to the conveyer, as and for the purpose set forth.

2. In a corn harvester, the combination with the main platform mounted on wheels, and a cutting apparatus at its front end; of a stalk conveyer in rear of said apparatus consisting of a support mounted on the platform and having on its upper face ratchet teeth facing to the rear, a guide above the outer edge of said support, and a rack above the inner edge of said support also provided with ratchet teeth facing to the rear; and connections substantially as described between the main wheels and the conveyer for imparting longitudinal reciprocating motion to the latter, as and for the purpose set forth.

3. In a corn harvester, the combination with the main platform mounted on wheels, and a cutting apparatus at its front end; of a stalk conveyer in rear of said apparatus consisting of a support mounted on the platform and having on its upper face ratchet teeth facing to the rear, a guide above the outer edge of said support, and a rack mounted in guides above the inner edge of said support also provided with ratchet teeth facing to the rear; and connections substantially as described between the main wheels and the support and rack for imparting longitudinal reciprocating motion to the support and rack in simultaneously opposite directions, as and for the purpose set forth.

4. In a corn harvester, the combination with the main platform mounted on wheels, and a cutting apparatus at its front end; of a stalk conveyer in rear of said apparatus consisting of a support mounted on the platform and having on its upper face ratchet teeth facing to the rear, a guide above the outer edge of said support, and a rack above the inner edge of said support also provided with ratchet teeth facing to the rear, said rack being mounted in guides on the platform; and connections substantially as described between the main wheels and rack for imparting a longitudinal reciprocating motion to the latter, as and for the purpose set forth.

5. In a corn harvester, the combination with the main platform mounted on wheels, and a cutting apparatus at its front end; of a stalk conveyer in rear of said apparatus consisting of a support mounted on the platform and having on its upper face ratchet teeth facing to the rear, a rack above the inner edge of the support also having ratchet teeth facing to the rear, an upright plate carried by the outer edge of the support and converging to the rear toward the rack, and a guide carried by the platform opposite said rack; and connections substantially as described between the main wheels and conveyer for reciprocating the latter longitudinally of the machine, as and for the purpose set forth.

6. In a corn harvester, the combination with the main platform mounted on wheels, and a cutting apparatus at its front end; of a stalk conveyer in rear of said apparatus consisting of a support mounted on the platform and having on its upper face ratchet teeth facing to the rear, a rack above the inner edge of the support also having ratchet teeth facing to the rear, an upright plate at the outer edge of the support, clips on the platform and in front and in rear of the conveyer, and a guide whose body stands opposite said rack and whose extremities are adjustably clamped under said clips; and connections substantially as described between the main driving wheels and conveyer for reciprocating the latter longitudinally of the machine, as and for the purpose set forth.

7. In a corn harvester, the combination with the main platform mounted on wheels, a cutting apparatus at the front end thereof, and upright guides rising from the platform; of a stalk conveyer comprising a support mounted on the platform in rear of the cutting apparatus and having ratchet teeth facing to the rear, a guide rod above the outer edge of said support, a rack above the inner edge of the support consisting of a body of T-shaped cross section mounted in said upright guides and having ratchet teeth projecting over the support and facing to the rear, a rock-lever centrally pivoted to one upright guide and pivotally connected at its ends with the support and the rack, and connections substantially as described between the main driving wheels and the support for reciprocating the latter longitudinally of the machine, as and for the purpose set forth.

8. In a corn harvester, the combination with the main platform mounted on wheels, a cutting apparatus at the front end thereof, a shocker at the rear end thereof, upright guides rising from the platform, and a finger extending rearward from the rearmost guide over the platform toward the shocker for the purpose set forth; of a stalk conveyer comprising a support mounted on the platform in rear of the cutting apparatus and having ratchet teeth facing to the rear, a guide rod above the outer edge of said support, a rack above the inner edge of the support consisting of a body mounted in said upright guides and having ratchet teeth projecting over the support and facing to the rear, the rear end of the rack moving just below said finger, and connections substantially as described between the main driving wheels and the support and rack for reciprocating the latter by the movement of the former, as and for the purpose set forth.

9. In a corn harvester, the combination with the main platform, the cutting apparatus arranged at the front corner thereof, two stalk conveyers in rear of the cutting apparatus, and two tables in rear of the conveyers; of a shocker disposed at the center of the rear end of the machine between the tables and consisting of a pair of frames pivoted on the platform, front wings each pivoted at one corner to the front end of its frame, a pair of links pivoted at one extremity to the other corners of these wings, having their bodies crossed, and pivoted at their other ends to the opposite frame, rear wings pivoted between their extremities to the rear ends of the frames, a single link pivotally connecting these wings above their supporting pivots, and means substantially as described for swinging said frames simultaneously outward and inward, as and for the purpose set forth.

10. In a corn harvester, the combination with the main platform, the cutting apparatus arranged at the front corner thereof, two stalk conveyers in rear of the cutting apparatus, and two tables in rear of the conveyers; of a shocker disposed at the center of the rear end of the machine between the tables and consisting of a pair of H-shaped frames having their feet pivoted on the platform, front wings each pivoted at one corner to the front end of its frame, a pair of links pivoted at one extremity to the other corners of these wings, having their bodies crossed, and pivoted at their other ends to the opposite frame, means for swinging said frames simultaneously toward and away from each other, and wings pivoted to the rear ends of the frames and moving in directions opposite to the movements of the front wings, as and for the purpose set forth.

11. In a corn harvester, the combination with the main platform, the cutting apparatus arranged at the front corner thereof, two stalk conveyers in rear of the cutting apparatus, and two tables in rear of the conveyers; of a shocker disposed at the center of the rear end of the machine between the tables and consisting of a pair of H-shaped frames having their feet pivoted on the platform, rear wings pivoted between their extremities to the rear ends of these frames and having rearwardly projecting ears at their upper ends, a link pivotally connecting these wings above their supporting pivots and having a central notch in its upper edge, means for swinging the frames simultaneously toward and away from each other, and wings pivoted to the front ends of the frames and moving in directions opposite to the movements of the rear wings, as and for the purpose set forth.

12. In a corn harvester, the combination with the main platform, the cutting apparatus arranged at the front corner thereof, two stalk conveyers in rear of the cutting apparatus, and two tables in rear of the conveyers; of a shocker disposed at the center of the rear end of the machine between the tables and consisting of a pair of frames pivoted on the platform, a pair of arms pivoted to the front ends of the frames, means for throwing the arms out horizontal when the frames are approximated, a pair of arms pivoted to the rear ends of the frames, means for throwing these arms out horizontal when the frames are separated, guides rising from the platform, a bar sliding longitudinally in said guides between the frames and having a handle, and links pivotally connecting said bar with the frames, as and for the purpose set forth.

In testimony whereof I have hereunto set my hand in presence of two subscribing witnesses.

WILLIAM MILBRATH.

Witnesses:
LOUIS FEESER, Jr.,
JOHN F. BRUGGEMANN.